United States Patent
Wan

(10) Patent No.: US 9,146,120 B2
(45) Date of Patent: Sep. 29, 2015

(54) NAVIGATION SYSTEM WITH ROUTE CLASSIFICATION MECHANISM AND METHOD OF OPERATION THEREOF

(71) Applicant: Telenav, Inc., Sunnyvale, CA (US)

(72) Inventor: Feng Wan, Mountain View, CA (US)

(73) Assignee: TELENAV INC., Sunnyvale, CA (US)

(*) Notice: Subject to any disclaimer, the term of this patent is extended or adjusted under 35 U.S.C. 154(b) by 21 days.

(21) Appl. No.: 13/888,601

(22) Filed: May 7, 2013

(65) Prior Publication Data

US 2014/0336918 A1 Nov. 13, 2014

(51) Int. Cl.
G01C 21/00 (2006.01)
G01C 21/34 (2006.01)
G01C 21/20 (2006.01)
G08G 1/16 (2006.01)

(52) U.S. Cl.
CPC ............ *G01C 21/3446* (2013.01); *G01C 21/20* (2013.01); *G01C 21/34* (2013.01); *G01C 21/3453* (2013.01); *G08G 1/166* (2013.01)

(58) Field of Classification Search
CPC .... G01C 21/34; G01C 21/3453; G01C 21/20; G08G 1/166
USPC .......................................... 701/400, 527, 533
See application file for complete search history.

(56) References Cited

U.S. PATENT DOCUMENTS

2010/0036603 A1* 2/2010 Kang ............................ 701/201
2011/0113155 A1 5/2011 Kuznetsov et al.
2011/0246055 A1 10/2011 Huck et al.
2012/0072104 A1* 3/2012 Sakai et al. ................... 701/400
2013/0204524 A1* 8/2013 Fryer et al. .................... 701/527

OTHER PUBLICATIONS

Delling et al., "Highway Hierarchies Star", , pp. 1-29, Publisher: Universitat Karlsruhe, Published in: Karlsruhe, Germany.
Jenkins, "Introduction to Route Calculation", May 7, 2007, pp. 1-9, vol. Version 1.0, No. Q1 2007, Publisher: Naviteq.
Knopp et al., "Computing Many-to-Many Shortest Paths Using Highway Hierarchies", , pp. 36-45, Publisher: Siam.
Rodriguez, "Highway Hierarchies (Dominik Schultes)", , pp. 1-51.
Sanders et al., "Engineering Highway Hierarchies", 2006, pp. 804-816, vol. ESA 2006, No. LNCS 4168, Publisher: Universitat Karlsruhe, Published in: Karlsruhe, Germany.
Sanders et al., "Highway Hierarchies Hasten Exact Shortest Path Queries", 2005, pp. 568-579, vol. ESA 2005, No. LNCS 3669, Publisher: Universitat Karlsruhe, Published in: Karlsruhe, Germany.
Schultes, "Fast and Exact Shortest Path Queries Using Highway Hierarchies", Jul. 2005, pp. 1-74, Publisher: Universitat Karlsruhe, Published in: Karlsruhe, Germany.
Schultes, "Route Planning in Road Networks", Feb. 7, 2008, pp. 1-235, Publisher: Universitat Karlsruhe, Published in: Karlsruhe, Germany.

* cited by examiner

*Primary Examiner* — Gertrude Arthur Jeanglaude
(74) *Attorney, Agent, or Firm* — IP Investment Law Group

(57) ABSTRACT

A method of operation of a navigation system includes: determining a route classification of a candidate route; determining a misclassification of the route classification for identifying the candidate route misclassified; updating the route classification based on the misclassification for reclassifying the candidate route; generating a travel route based on the candidate route with the route classification updated for displaying on a device.

20 Claims, 7 Drawing Sheets

NAVIGATION SYSTEM WITH ROUTE CLASSIFICATION MECHANISM AND METHOD OF OPERATION THEREOF

TECHNICAL FIELD

The present invention relates generally to a navigation system, and more particularly to a system for route classification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, identifying a route with proper classification has become a paramount concern for the consumer. The inability decreases the benefit of using the tool.

Thus, a need still remains for a navigation system with route classification mechanism. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a route classification of a candidate route; determining a misclassification of the route classification for identifying the candidate route misclassified; updating the route classification based on the misclassification for reclassifying the candidate route; generating a travel route based on the candidate route with the route classification updated for displaying on a device.

The present invention provides a navigation system, including: a candidate module for determining a route classification of a candidate route; an estimation module, coupled to the candidate module, for determining a misclassification of the route classification for identifying the candidate route misclassified; a reclassification module, coupled to the estimation module, for updating the route classification based on the misclassification for reclassifying the candidate route; and a route module, coupled to the reclassification module, for generating a travel route based on the candidate route with the route classification updated for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
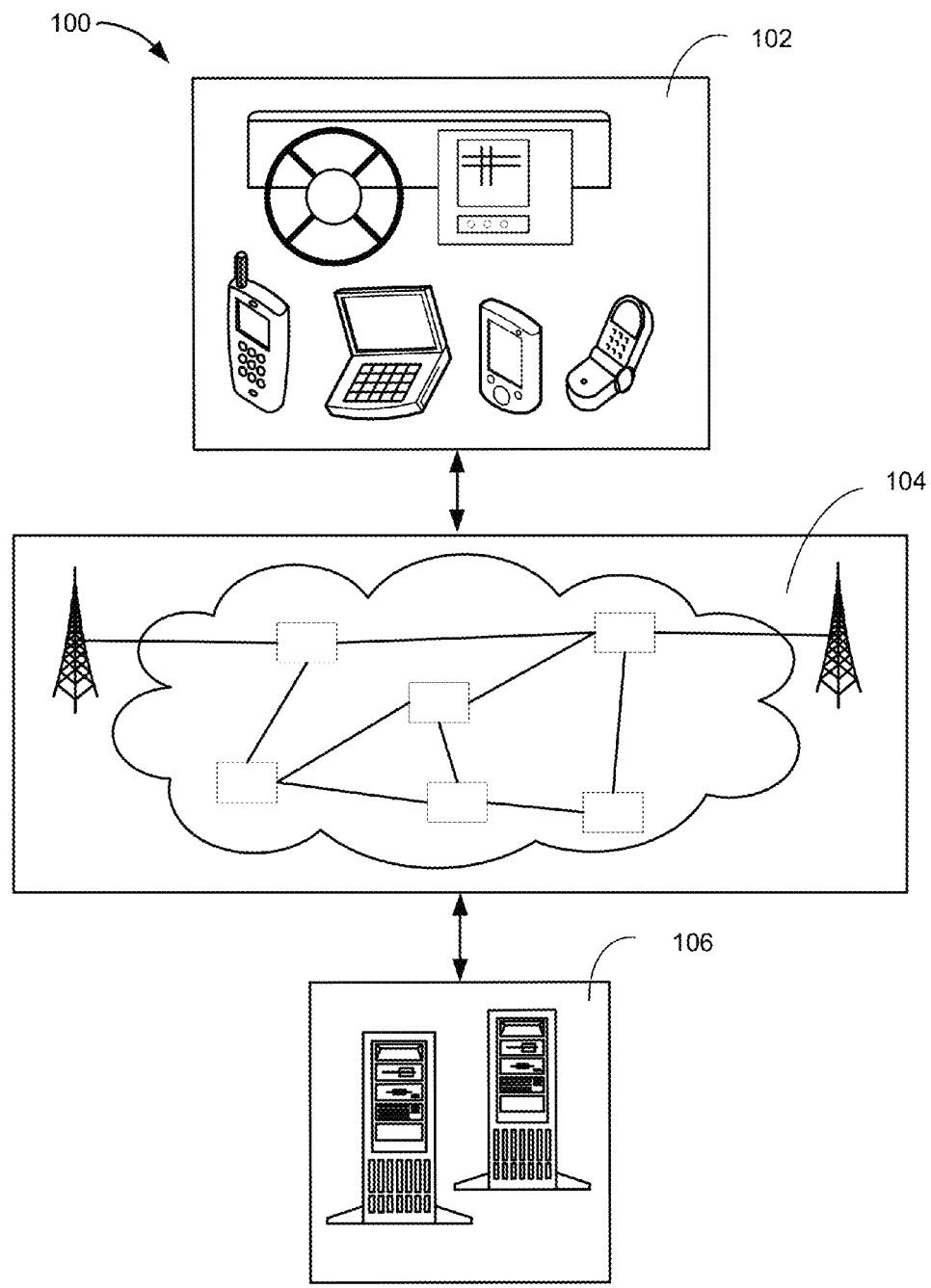
FIG. 1 is a navigation system with route classification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with route classification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
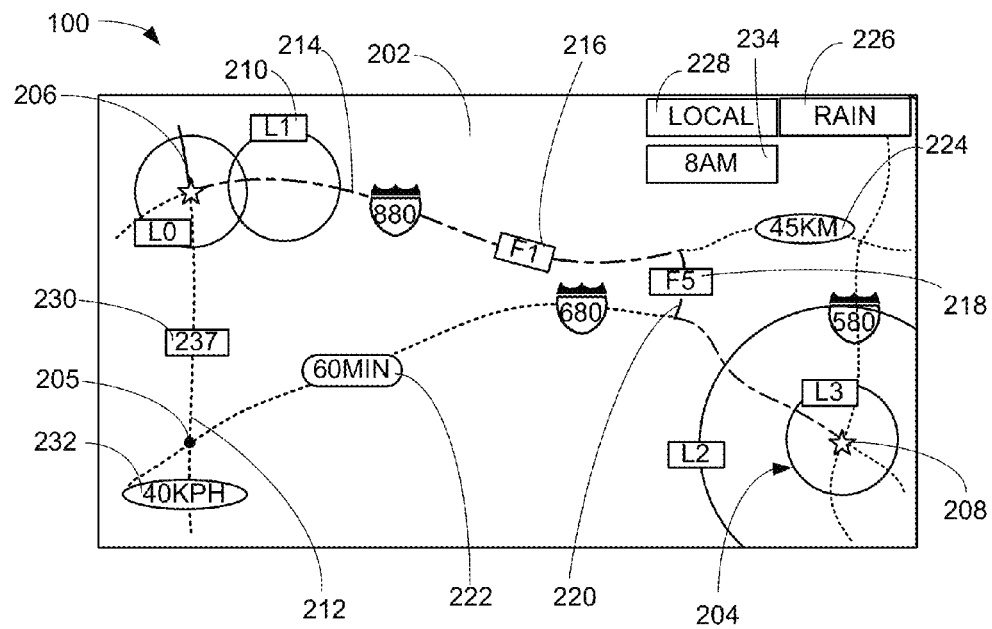
FIG. 2 is a display example of a display interface of the first device.

Referring now to FIG. 2, therein is shown a display example of a display interface 202 of the first device 102 of FIG. 1. For clarity and brevity, the discussion of the present invention will focus on the first device 102 displaying the result generated by the navigation system 100. However, the second device 106 of FIG. 1 and the first device 102 can be discussed interchangeably.

The display example illustrates the result generated by the navigation system 100 to the first device 102 for guiding the user of the first device 102 from one geographic location to another. The first device 102 can display a neighboring area 204, which is defined as a geographic region surrounding a node 205.

For example, the node 205 can represent a geographic location where the navigation system 100 can make a decision on how to proceed with a travel. For a specific example, a start location 206 can represent the node 205. For another example, the neighboring area 204 can surround the start location 206 or a target destination 208. The start location 206 is defined as the starting geographic location of a travel. The target destination 208 is defined as the ending or intermediate geographic location of the travel.

For another example, the start location 206 and the target destination 208 can each be surrounded by a plurality of the neighboring area 204. Each of the plurality of the neighboring area 204 can have a different geographic area from one another. For example, smaller instance of the neighboring area 204 can be surrounded by the bigger instance of the neighboring area 204. For a different example, one instance of the neighboring area 204 can be adjacent to another instance of the neighboring area 204, with both instances of the neighboring area 204 sharing an overlapping geographic area. For another example, the shape of the neighboring area 204 can include a variety of shapes, such as a circle, a borderline of a city, or a combination thereof.

The neighboring area 204 can have an area level 210, which is defined as a hierarchy of the neighboring area 204. For example, the neighboring area 204 closest to the start location 206 can represent the area level 210 of level 0. The neighboring area 204 surrounding the next instance of the node 205 after the start location 206 can represent the area level 210 of level 1. Further, based on the Highway Hierarchy algorithm, level 1 can be higher level than level 0. More specifically, the neighboring area 204 with a higher level of the area level 210 can include a candidate route 212 with more importance than neighboring area 204 with a lower level of the area level 210.

For a different example, the neighboring area 204 with a higher instance of the area level 210 can surround the neighboring area 204 with a lower instance of the area level 210. As illustrated in FIG. 2, the target destination 208 can be within the neighboring area 204 with the area level 210 of level 3. Further, the neighboring area 204 with the area level 210 of level 3 can be completely surrounded by the neighboring area 204 with the area level 210 of level 2. The numerical value of the area level 210 can be denoted from level 1 to level 5 with level 1 being the highest or vice versa.

The first device 102 can display the candidate route 212, which is defined as a path considered by the navigation system 100 for generating a travel route 214. The travel route 214 is defined as a path from the start location 206 to the target destination 208. For example, the navigation system 100 can select from a plurality of the candidate route 212 for generating the travel route 214 from the start location 206 to the target destination 208.

For further example, the navigation system 100 can consider the plurality of the candidate route 212 within each of the plurality of the neighboring area 204 for selecting the candidate route 212 for generating the travel route 214. For example, the navigation system 100 can consider the candidate route 212 within the neighboring area 204 with the area level 210 of level 0 followed by the consideration of the candidate route 212 within the neighboring area 204 with the area level 210 of level 1. Details regarding the consideration of the candidate route 212 in the neighboring area 204 will be discussed below.

A route classification 216 can classify the candidate route 212. The route classification 216 is defined as a level of importance attributed to the candidate route 212. The level of importance can be represented by a functional class. The functional class can represent from level 1 to level 5 with level 1 being the most important. For example, the candidate route 212 can have the route classification 216 with the functional class of level 1 to level 5 with level 1 being most important and level 5 being least important.

The functional class can represent a categorization of a road or a group of roads by government entity, such as the United States Federal Highway Administration. For example, the importance of the road can base on an amount of usage of the road. More specifically, the road can be deemed important if the amount of traffic is high. In contrast, if the road is seldom used, the road can be deemed less important.

For a different example, the road can be categorized as a local road, an arterial road, or an interstate highway. The government entity can assign the functional class for the local road, the arterial road, or the interstate highway. For example, the local road can have the functional class of level 5 while the interstate highway can have the functional class of level 1.

For illustrative purposes, the neighboring area 204 can be designated with the area level 210 that corresponds with the route classification 216. More specifically, if the route classification 216 of the candidate route 212 discovered is level 5, the area level 210 for the neighboring area 204 having that instance of the candidate route 212 can also be level 5.

For further example, the navigation system 100 can generate the travel route 214 based on connecting the plurality of the candidate route 212 with a plurality of the route classification 216. For a specific example, the travel route 214 can include the following combination of the plurality of the candidate route 212: the candidate route 212 that is level 5; the candidate route 212 that is level 4; the candidate route 212 that is level 3; the candidate route 212 that is level 4; and the candidate route 212 that is level 5.

For further example, the navigation system 100 can generate the travel route 214 based on the route classification 216. More specifically, the navigation system 100 can generate the travel route 214 with a higher level of the route classification 216. For example, the navigation system 100 can generate the travel route 214 with only the candidate route 212 with the route classification 216 of level 2 and above.

The navigation system 100 can determine a misclassification 218 of the route classification 216. The misclassification 218 is defined as an underestimation or an overestimation of the route classification 216 of the candidate route 212. For example, the candidate route 212 can be classified as the functional class of level 5 when the more accurate classification should have been the functional class of level 4. More specifically, the importance of the candidate route 212 was underestimated as the functional class of level 5.

For a specific example, the misclassification 218 of the candidate route 212 can result in a filtration of the candidate route 212. For example, the navigation system 100 can first search for the candidate route 212 with the route classification 216 of level 5. After the navigation system 100 had considered the candidate route 212 of level 5 within the neighboring area 204, the navigation system 100 can consider the next level of the route classification 216.

More specifically, the navigation system 100 can consider the candidate route 212 with the route classification 216 of level 4 and no longer consider the route classification 216 of level 5. For example, the navigation system 100 can exclude the candidate route 212 with the route classification 216 of level 5 for generating the travel route 214. More specifically, the navigation system 100 can only consider for the candidate route 212 with route classification 216 with level 4 or above even though there can be more of the candidate route 212 with the route classification 216 of level 5 within the neighboring area 204.

However, the candidate route 212 with the route classification 216 of level 5 can be a preferred path 220. More specifically, the candidate route of level 5 that is excluded should be part of the travel route 214 for reaching the target destination 208. The navigation system 100 can determine the misclassification 218 of the candidate route 212 that should have been considered for the travel route 214.

Subsequently, the navigation system 100 can update the route classification 216 based on the misclassification 218 to reclassify the candidate route 212 to include the preferred path 220 as part of the travel route 214. Moreover, the navigation system 100 can update the route classification 216 from the functional class of level 5 to level 4. Details regarding the updating of the route classification 216 will be discussed below.

The preferred path 220 can represent the candidate route 212 that was misclassified. For example, the preferred path 220 can include the candidate route 212 having the lowest of a travel cost 222, a shortest of a distance 224, best of a travel condition 226, or a combination thereof. For another example, the preferred path 220 can be the candidate route 212 desired by a user's preference 228. The navigation system 100 can determine the misclassification 218 based on the travel cost 222, the distance 224, the travel condition 226, the user's preference 228, or a combination thereof. Details regarding the determination of the misclassification 218 will be discussed below.

The travel cost 222 can represent as the burden that the user of the first device 102 can incur for traversing the candidate route 212. For example, the travel cost 222 can be measured by an incurrence of a travel time, a travel financial cost, a fuel consumption, or a combination thereof for traversing the candidate route 212. The distance 224 can represent a physical length of the candidate route 212.

The travel condition 226 can represent a circumstance that can exist at the time when the user of first device 102 is traveling, plan to travel, or a combination thereof. For example, the travel condition 226 can be rainy weather when the user of the first device 102 is commuting to work. For another example, the navigation system 100 can factor in a public holiday, such as the Independence Day festivity, as the travel condition 226 for traveling during over the weekend. For a different example, the travel condition 226 can include a traffic speed for traversing the candidate route 212.

The user's preference 228 is defined as a predilection of the user of the first device 102. For example, the user's preference 228 can include the user's desire to travel along a route type 230 of a local road for the morning commute during a rush hour. The route type 230 is defined as a categorization of the candidate route 212. For example, the route type 230 of the candidate route 212 can include the local road, the arterial road, or the interstate highway. For further example, the local road can have the route classification 216 of level 5 while the interstate highway can have the route classification 216 of level 1.

The navigation system 100 can determine the misclassification 218 based on the travel cost 222, the distance 224, the travel condition 226, the user's preference 228, or a combination thereof meeting, exceeding, dipping below, or a combination thereof a reclassification threshold 232. The reclassification threshold 232 is defined as a limit for determining whether the candidate route 212 should be reclassified.

For example, the navigation system 100 can upgrade the route classification 216 of the candidate route 212 if the traffic speed for traversing the candidate route 212 is above the reclassification threshold 232 representing a speed limit. For another example, the reclassification threshold 232 representing the travel cost 222 can be zero financial cost or freeway. The navigation system 100 can downgrade the route classification 216 if the candidate route 212 is a tolled highway.

A time period 234 is defined as a time of the day. For example, the time period 234 can represent the morning rush hour. For another example, the time period 234 can represent the hour of a day, the day in a week, the week in a month, or a combination thereof.

Figure 3:
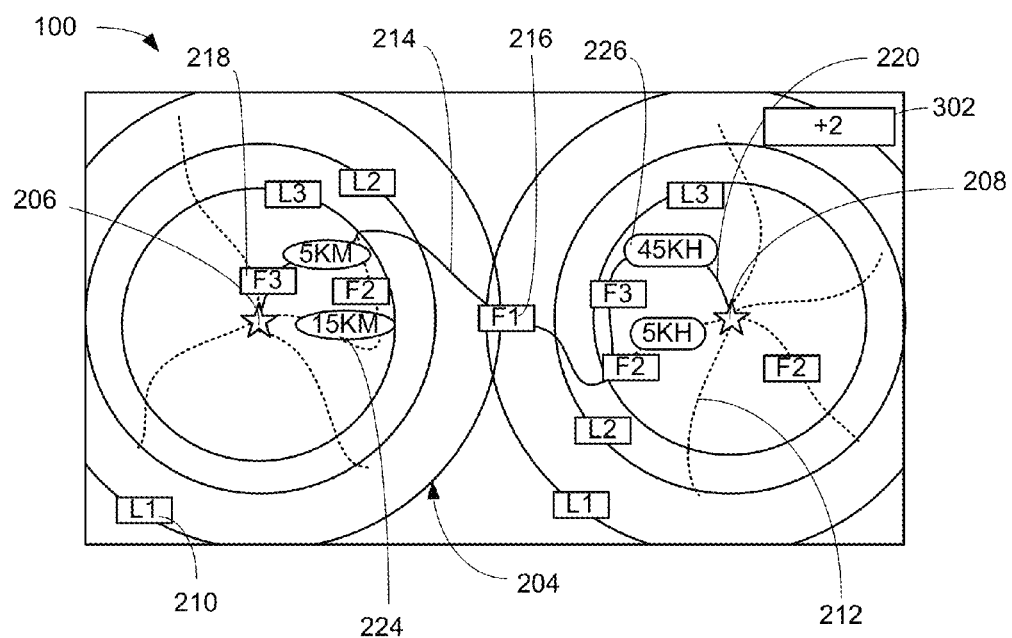
FIG. 3 is an example of the misclassification of the route classification of the candidate route.

Referring now to FIG. 3, therein is shown an example of the misclassification 218 of the route classification 216 of the candidate route 212. For example, the neighboring area 204 surrounding the start location 206 can include the plurality of the candidate route 212. One instance of the candidate route 212 can have the route classification 216 of level 3. Another of the candidate route 212 can have the route classification 216 of level 2.

For further example, the start location 206 can be surrounded by multiple instances of the neighboring area 204. The area level 210 of the neighboring area 204 can start from level 3 to level 1. For this example, the area level 210 can correspond with the route classification 216. As a result, the neighboring area 204 with the candidate route 212 having the route classification 216 of level 3 can be designated with the area level of level 3.

The target destination 208 can be surrounded by multiple instances of the neighboring area 204 similarly as the start location 206. Furthermore, the outer most instances of the neighboring area 204 surrounding the start location 206 and the target destination 208 can overlap each other. For example, the neighboring area 204 with the area level 210 of level 1 surrounding the start location 206 can over leap with the neighboring area 204 with the area level 210 of level 1 surrounding the target destination 208. Furthermore, the route classification 216 of the candidate route 212 can be level 1 as well.

Continuing with the example, the navigation system 100 can exclude the candidate route 212 with the route classification 216 below level 2. As a result, the candidate route 212 with the route classification 216 of level 3 can be not considered for generating the travel route 214.

However, the candidate route 212 with the route classification 216 of level 3 can have the distance 224 of 8 kilometers (km). The candidate route 212 with the route classification 216 of level 2 can have the distance 224 of 15 km. Based on the distance 224, the candidate route 212 with the distance 224 of 8 km can be the preferred path 220. The candidate route 212 with the distance of 8 km can be underestimated with the route classification 216 of level 3 while the candidate route 212 with the distance 224 of 15 km can be overestimated with the route classification 216 of level 2. As result, the navigation system 100 can determine the misclassification 218 of the candidate route 212. Subsequently, the navigation system 100 can upgrade or downgrade the route classification 216 for reclassifying the candidate route 212. Details will be discussed below.

For another example, the neighboring area 204 surrounding the target destination 208 can include the plurality of the candidate route 212. One instance of the candidate route 212 can have the route classification 216 of level 3. Another of the candidate route 212 can have the route classification 216 of level 2. The candidate route 212 with the route classification 216 of level 3 can have the lower function class than another of the candidate route 212 because the candidate route 212 with the route classification 216 of level 3 can be longer of the distance 224.

However, the travel condition 226 for the candidate route 212 with the route classification 216 of level 2 can be heavy traffic with the traffic speed of 8 kilometers per hour (kph). The travel condition 226 of the candidate route 212 with the route classification 216 of level 3 can be light traffic with the traffic speed of 75 kph. The navigation system 100 can determine the misclassification 218 of the candidate route 212 with the traffic speed of 75 kph as having the route classification 216 of level 3. The navigation system 100 can update the route classification 216 of the candidate route 212 with the traffic speed of 75 kph to the route classification 216 of level 2 based on the misclassification 218.

An update range 302 can represent the extent which the route classification 216 can be upgraded or downgraded. For example, the route classification 216 can be upgraded two levels from level 5 to level 3. The upgrade of two levels can represent the update range 302.

Figure 4:
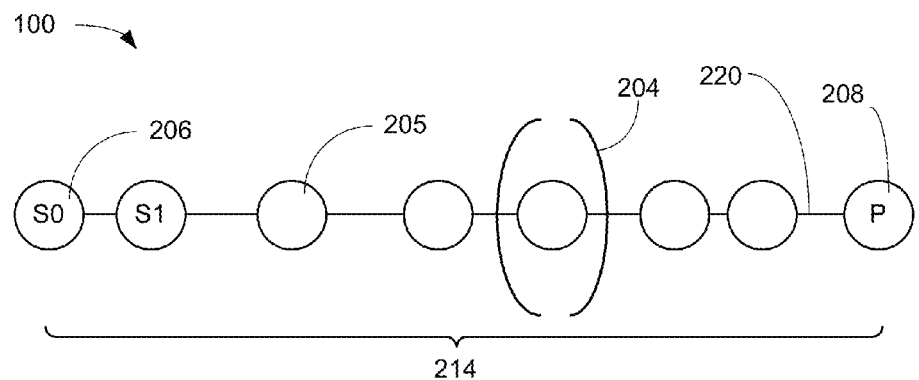
FIG. 4 is an example of construction of a partial shortest path tree.

Referring now to FIG. 4, therein is shown an example of construction of a partial shortest path tree. The partial shortest path tree can represent the travel route 214. For example, the navigation system 100 can construct the travel route 214 based on aggregating the preferred path 220.

The navigation system 100 can generate the preferred path 220 based on the highway hierarchy algorithm. More specifically, $S_0$ can represent the start location 206. P can represent the target destination 208. The navigation system 100 can construct the partial shortest path tree by determining the preferred path 220 for shortest of the distance 224 of FIG. 2 from one instance of the node 205 to another instance of the node 205 until reaching the target destination 208. The abort criterion for constructing the partial shortest path tree can be based on the two instances of the neighboring area 204 sharing the same instance of the node 205. Details regarding the construction will be discussed below.

Figure 5:
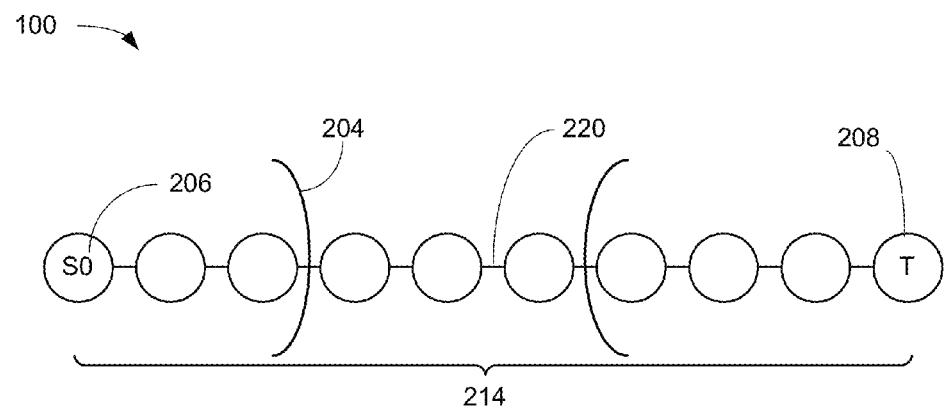
FIG. 5 is an example of a high level network between one instance of the neighboring area and another instance of the neighboring area.

Referring now to FIG. 5, therein is shown an example of a high level network between one instance of the neighboring area 204 and another instance of the neighboring area 204. The high level network can represent the preferred path 220 after leaving each instances of the neighboring area 204. More specifically, the preferred path 220 can represent a canonical shortest path from the start location 206 to the target destination 208. The preferred path 220 can also represent the path having the shortest of the distance 224 of FIG. 2. The navigation system 100 can generate the canonical shortest path for generating the travel route 214.

Figure 6:
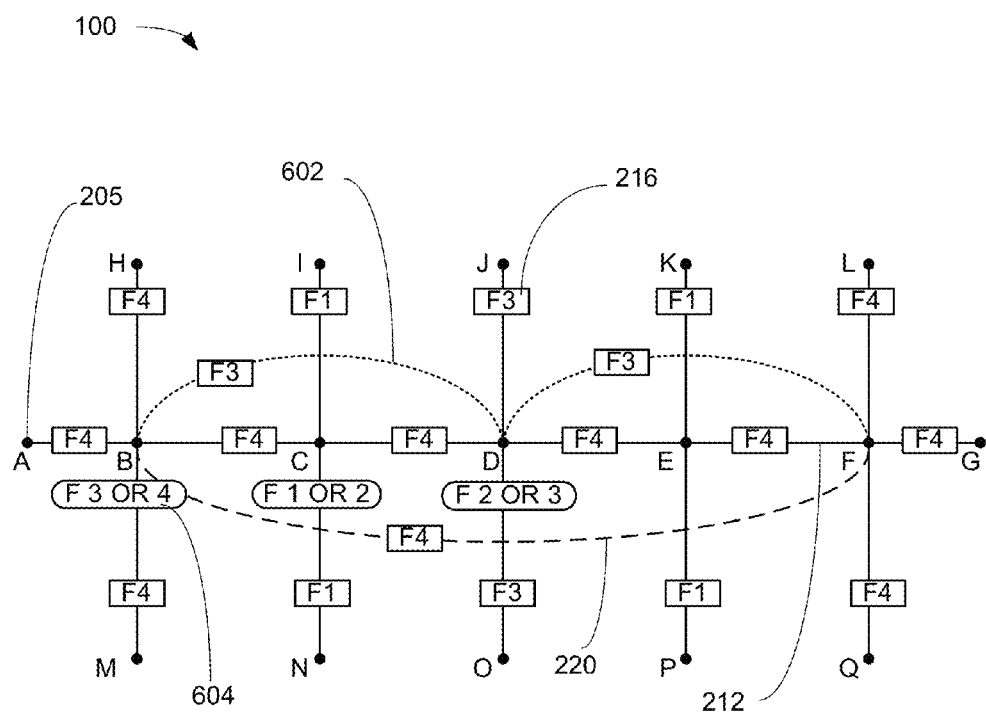
FIG. 6 is an example of a shortcut from one instance of the node to another instance of the node.

Referring now to FIG. 6, therein is shown an example of a shortcut 602 from one instance of the node 205 to another instance of the node 205. The node 205 can be labeled with "A," "B," "C," "D," so on and so forth up to "Q" in FIG. 6 to distinguish each instances of the node 205. The shortcut 602 is defined as a path that provides a quicker way from one instance of the node 205 to another instance of the node 205. For example, the shortcut 602 can represent from the path from a "B" instance of the node 205 to "D" instance of the node 205. For further example, the shortcut 602 can have the route classification 216. More specifically, the shortcut 602 can have the route classification 216 with the functional class of level 3 or level 4 as illustrated in FIG. 6.

A node classification 604 is defined as a level of importance attributed to the node 205. Similarly to the route classification 216, the node classification 604 can be represented by the functional class. The functional class can represent from level 1 to level 5 with level 1 being the most important. Moreover, the node classification 604 can based on the route classification 216 of the candidate route 212 connected to the node 205. For example, "D" instance of the node 205 can have the candidate route 212 with the route classification 216 of level 3 and level 4 of the functional class. "D" instance of the node 205 can have the functional class of level 3 by selecting the higher instance of the functional class of the route classification 216.

For further example, the quicker way can represent the path having the lowest of the travel cost 222 of FIG. 2, a shortest of the distance 224 of FIG. 2, best of the travel condition 226 of FIG. 2, or a combination thereof. More specifically, the candidate route 212, the preferred path 220, or a combination thereof can represent the shortcut 602 for the navigation system 100 to consider for generating the travel route 214 of FIG. 2. Details regarding the generation the travel route 214 based on the shortcut 602 will be discussed below.

Figure 7:
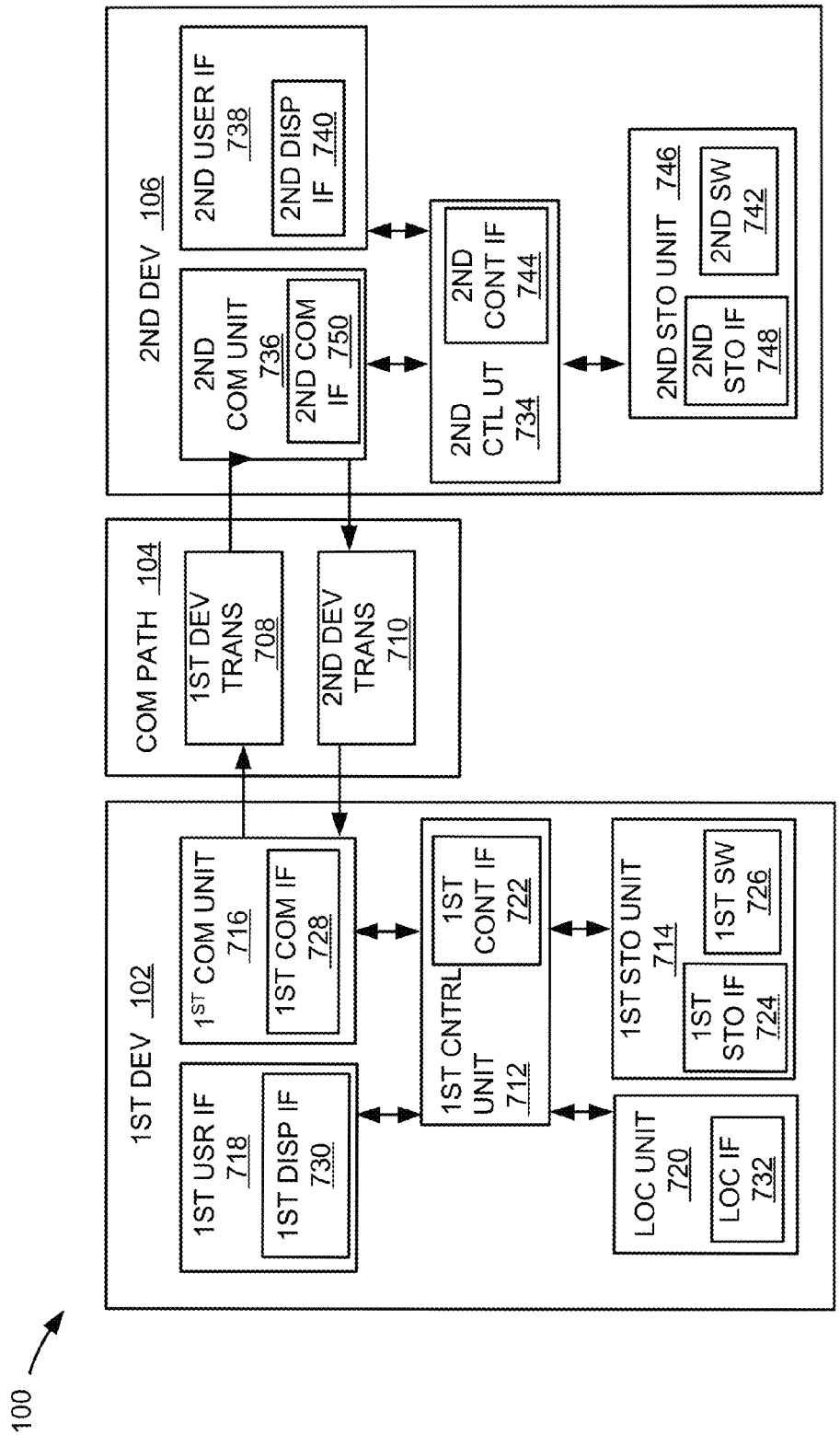
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the navigation system 100. The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations physically separate to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations physically separate to the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations physically separate to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 via the first communication unit 716.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second control interface 744. The second control interface 744 can be used for communication between the second control unit 734 and other functional units in the second device 106. The second control interface 744 can also be used for communication that is external to the second device 106.

The second control interface 744 can receive information from the other functional units or from external sources, or can transmit information to the other functional units or to external destinations. The external sources and the external destinations refer to sources and destinations physically separate to the second device 106.

The second control interface 744 can be implemented in different ways and can include different implementations depending on which functional units or external units are being interfaced with the second control interface 744. For example, the second control interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as nonvolatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations physically separate to the second device 106.

The second storage interface 748 can include different implementations depending on which functional units or external units are being interfaced with the second storage unit 746. The second storage interface 748 can be implemented with technologies and techniques similar to the implementation of the second control interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second control interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
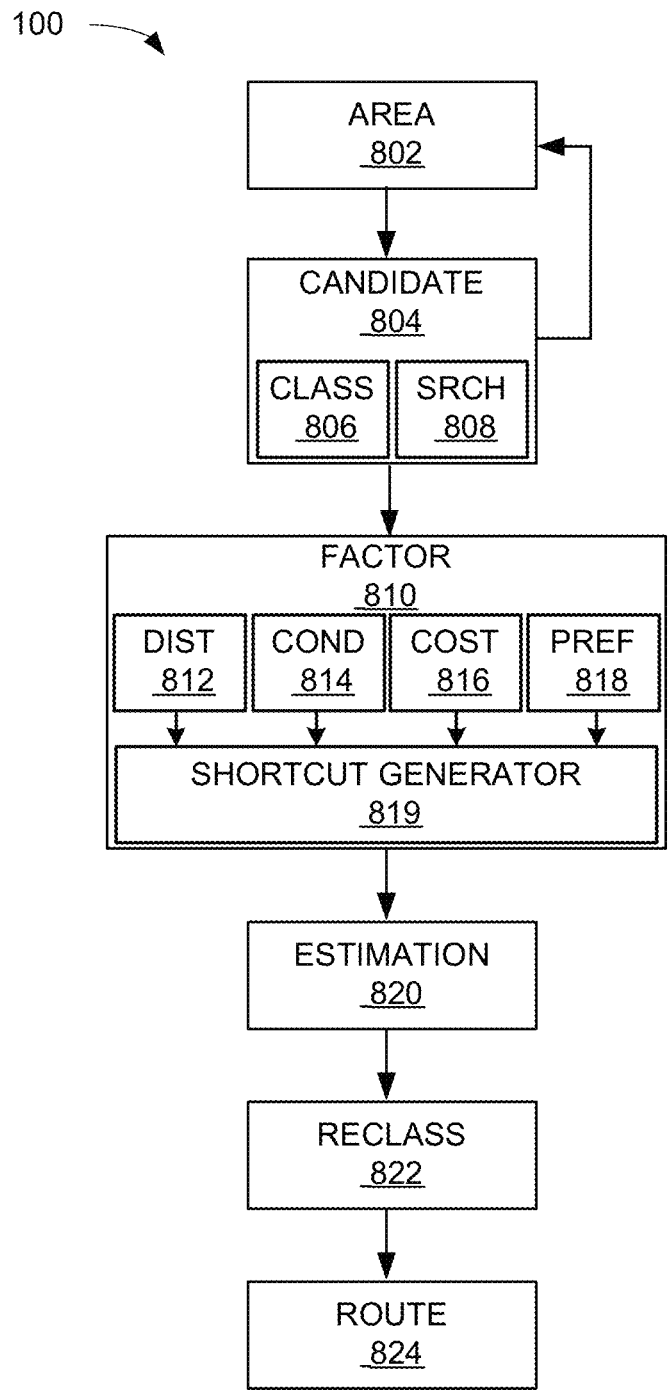
FIG. 8 is a control flow of the navigation system.

Referring now to FIG. 8, therein is shown a control flow of the navigation system 100. The navigation system 100 can include an area module 802. The area module 802 calculates the neighboring area 204 of FIG. 2. For example, the area module 802 can calculate the neighboring area 204 surrounding the start location 206 of FIG. 2, the target destination 208 of FIG. 2, or a combination thereof.

The area module 802 can calculate the neighboring area 204 in a number of ways. For example, the area module 802 can calculate the neighboring area 204 for the start location 206 to be the geographic area with a radius of 20 km from the start location 206. For a specific example, the area module 802 can calculate the neighboring area 204 based on the Functional Class Routing algorithm.

More specifically, the area module 802 can calculate the neighboring area 204 surrounding the start location 206 based on the location of the "H-th" instance of the node 205 of FIG. 2. "H" can represent a promoter value that indicates the number of the node 205 considered within the neighboring area 204. For example, if "H" equals 5, the area module 802 can calculate the neighboring area 204 based on the fifth furthest instance of the node 205 from the start location 206. For further example, the area module 802 can calculate the neighboring area 204 based on the 5 instances of the node 205 closest to the start location 206, the target destination 208, or a combination thereof.

For a different example, the area module 802 can calculate the plurality of the neighboring area 204 for the target destination 208. More specifically, the area module 802 can calculate the first instance of the neighboring area 204 to be the geographic area with the radius of 10 km from the target destination 208. And the area module 802 can calculate the second instance of the neighboring area 204 to be the geographic area with the radius of 100 km from the target destination 208.

The navigation system 100 can include a candidate module 804, which can be coupled to the area module 802. The candidate module 804 identifies the candidate route 212 of FIG. 2 within the neighboring area 204. For example, the candidate module 804 can identify the plurality of the candidate route 212 in the neighboring area 204 surrounding the start location 206. For another example, the candidate module 804 can determine the route classification 216 of FIG. 2 of the candidate route 212.

The candidate module 804 can identify the candidate route 212 in a number of ways. The candidate module 804 can include a class module 806. The class module 806 determines the route classification 216. For example, the class module 806 can determine the route classification 216 based on the functional class attribute assigned to the candidate route 212 by the government, the vendor, or a combination thereof.

The candidate module 804 can include a search module 808. The search module 808 identifies the candidate route 212 with the route classification 216. For example, the search module 808 can identify the candidate route 212 with the Functional Class Routing algorithm. For a specific example, the search module 808 can identify the candidate route 212 from the lowest of the route classification 216 to the highest of the route classification 216. More specifically, the search module 808 can start identifying the candidate route 212 with the route classification 216 of level 5.

The search module 808 can identify the candidate route 212 for each of the route classification 216. For example, the search module 808 can identify the candidate route 212 with the route classification 216 from level 5 to level 1. The search module 808 can identify the candidate route 212 for each of the route classification 216 within the neighboring area 204 based on the functional class attributed to the candidate route 212.

For further example, the number of the candidate route 212 identifiable within the neighboring area 204 by the search module 808 can be based on the promoter parameter discussed above. If "H=5," the search module 808 can identify five instances of the candidate route 212 within the neighboring area 204. The search module 808 can identify the five instances of the candidate route 212 based on the candidate route 212 having the lowest of the travel cost 222 of FIG. 2, a shortest of the distance 224 of FIG. 2, best of the travel condition 226 of FIG. 2, or a combination thereof. The search module 808 can identify the candidate route 212 based on executing the DIJKSTRA algorithm. After five instances of the candidate route 212 are identified, the search module 808 can search for the candidate route 212 in a subsequent instance of the area level 210 of FIG. 2 of the neighboring area 204.

For illustrative purposes, the navigation system 100 is shown with the area module 802 calculating the neighboring area 204 based on the Functional Class Routing Algorithm, although it is understood that the area module 802 can be operated differently. For example, the area module 802 can calculate the neighboring area 204 based on the number of the node 205 in a priority queue.

As discussed, the search module 808 can identify the candidate route 212 based on the route classification 216, the travel cost 222, the distance 224, the travel condition 226, or a combination thereof. Each instance of the candidate route 212 connects one instance of the node 205 to another instance of the node 205. For example, the search module 808 can start searching from the node 205 representing the start location 206, the target destination 208, or a combination thereof.

The search module 808 can start from identifying the candidate route 212 with the lowest level of the route classification 216 prior to moving to the next level of the route classification 216. Further, the search module 808 can identify the route 212 having the lowest of the travel cost 222, a shortest of the distance 224, best of the travel condition 226, or a combination thereof for each level of the route classification 216.

As the candidate route 212 is identified, the search module 808 can place the node 205 in the priority queue. The node 205 in the priority queue can represent the node 205 having the candidate route 212 with the lowest of the travel cost 222, a shortest of the distance 224, best of the travel condition 226, or a combination thereof to reach that instance of the node 205. The search module 808 can continue adding the node 205 until the priority queue is filled.

The priority queue can have a set size. For example, the size of the priority queue can be "5." As a result, the search module 808 can continue adding the node 205 into the priority queue until five instances of the node 205 that are connected to the candidate route 212 with the lowest of the travel cost 222, a shortest of the distance 224, best of the travel condition 226, or a combination thereof are identified for the route classification 216. For example, the search module 808 can identify five instances of the node 205 with the candidate route 212 having the route classification 216 of level 5. If another instance of the node 205 is found with the lower of the travel cost 222, a shorter of the distance 224, better of the travel condition 226, the search module 808 can add that instance of the node 205 to replace the node 205 already in the priority queue.

The area module 808 can calculate the neighboring area 204 based on the node 205 in the priority queue. Continuing with the previous example, the priority queue can include five instances of the node 205. Each instances of the node 205 can be scattered in the geographic area. As a result, the geographic location of the node 205 can represent a boundary for the neighboring area 204. Therefore, the area module 808 can calculate the neighboring area 204 based establishing the node 205 as the boundary surrounding the start location 206, the target destination 208, or a combination thereof.

For illustrative purposes, the navigation system 100 is shown with the area module 802 calculating the neighboring area 204, although it is understood that the area module 802 can operate differently. For example, the area module 802 can determine the area level 210.

The area module 802 can determine the area level 210 in a number of ways. Continuing with the previous example, the area module 802 can determine the area level 210 of first instance of the neighboring area 204 surrounding the start location 206 to be level 0 or a starting level. The area module 802 can determine the area level 210 of the second instance of the neighboring area 204 surrounding the start location 206 or the node 205 after the start location 206 to be level 1, the subsequent level.

For another example, the area module 802 can determine the area level 210 based on identifying the candidate route 212 within the neighboring area 204. More specifically, the area module 802 can determine the first instance of the neighboring area 204 surrounding the start location 206 to be level 0. After identifying "H" number of the candidate route 212 within the first of the neighboring area 204, the area module 802 can determine the area level 210 of the next instance of the neighboring area 204 for searching the candidate route 212 to be level 1.

For a different example, the area module 802 can determine the area level 210 based on the route classification 216. More specifically, as discussed above, the search module 808 can identify the candidate route 212 with the route classification 216 of the level 5 first. After the priority queue is filled with the node 205 connected with the candidate route 212 having the route classification 216 of level 5, the search module 808 can search for the node 205 connected with the candidate route 212 having higher instance of the route classification 216.

As discussed above, the area module 802 can calculate the neighboring area 204 based on the node 205 in the priority queue surrounding the start location 206, the target destination 208, or a combination thereof. Hence, the candidate route 212 identified in the neighboring area 204 can represent the route classification 216 of level 5. As a result, the area module 802 can determine the area level 210 to correspond with the route classification 216 of level 5.

For illustrative purposes, the area module 808 can calculate for the subsequent instance of the neighboring area 204 after the area level 210 for the previous instance of the neighboring area 204 is determined. More specifically, the area level 210 for the inner most instance of the neighboring area 204 surrounding the start location 206 can be level 3. As illustrated in FIG. 3, the area module 808 can calculate for the neighboring area 204 with the area level 210 of level 2 which surrounds the neighboring area 204 with the area level 210 of level 3 based on the steps discussed above.

The navigation system 100 can include a factor module 810, which can be coupled to the candidate module 804. The factor module 810 determines the factors for determining the misclassification 218 of FIG. 2. For example, the factor module 810 can determine the distance 224 of FIG. 2 of the candidate route 212.

The factor module 810 can determine the factors in a number of ways. For example, based on the Highway Hierarchy algorithm, the factor module 810 can recompute for the candidate route 212 to identify the candidate route 212 filtered out by the functional class routing algorithm.

The factor module 810 can include a distance module 812. The distance module 812 can identify the candidate route 212 based on the Highway Hierarchy algorithm. More specifically, the distance module 812 can identify the candidate route 212 filtered out by the functional class routing algorithm. For example, the distance module 812 can identify the candidate route 212 based on determining the candidate route 212 for having the shortest of the distance 224 within the neighboring area 204.

For a specific example, the distance module 812 can determine that the candidate route 212 having the shortest of the distance 224 to be the preferred path 220 of FIG. 2 as illustrated in FIG. 4. The distance module 812 can execute the DIJKSTRA search from $S_0$ to find the candidate route 212 having the shortest of the distance 224 to reach a subsequent instance of the node 205, such as $S_1$. When the candidate route 212 is discovered or the node 205 is reached, the subsequent instance of the node 205 can adopt the activation state from an antecedent instance of the node 205, such as $S_0$.

The search of the candidate route 212 can end when the abort criterion, as discussed in FIG. 4, is met and the node 205 representative of the target destination 208, such as P, is settled, thus, no active unsettled node is left. As a result, the growth of the partial shortest path tree can stop based on the abortion criterion and when no active unsettled node is left. For another example, the distance module 812 can identify the candidate route 212 as the high level network between one instance of the neighboring area 204 and another instance of the neighboring area 204 based on the Highway Hierarchy algorithm.

The factor module 810 can include a condition module 814. The condition module 814 can determine the travel condition 226. For example, the condition module 814 can determine the traffic speed, a weather condition, or a combination thereof of the candidate route 212 by obtaining traffic information, weather information, or a combination thereof from external sources via the first control interface 722 of FIG. 7. For another example, the condition module 814 can determine the travel condition 226 of morning rush hour based on past traffic speed information and the time of day of when the past traffic speed information was gathered.

The factor module 810 can include a cost module 816. The cost module 816 can determine the travel cost 222. For example, the cost module 816 can determine the fuel cost, the travel time, the financial cost, or a combination thereof for traversing the candidate route 212. For a specific example, the cost module 816 can determine the financial cost based on whether the candidate route 212 is a High Occupancy Vehicle (HOV) lane. The cost module 816 can receive the monetary cost required for traversing the HOV lane from external sources via the first control interface 722. For another example, the cost module 816 can determine the travel time for traversing the candidate route 212 based on the distance 224 of the candidate route 212 and the traffic speed of the candidate route 212.

The factor module 810 can include a preference module 818. The preference module 818 can determine the user's preference 228 of FIG. 2. For example, the preference module 818 can determine the user's preference 228 based on the user's past activity. More specifically, the user of the first device 102 of FIG. 1 can travel along the candidate route 212 with the route type 230 of FIG. 2 of the local road during the rush hour. The preference module 818 can determine the user's preference 228 to be traveling along the local road during the rush hour.

The factor module 810 can include a shortcut generator module 819. The shortcut generator module 819 can generate the shortcut 602 of FIG. 6. The shortcut generator module 819 can generate the shortcut 602 in a number of ways. For example, the shortcut generator module 819 can generate the shortcut 602 based on aggregating the plurality of the candidate route 212.

For a specific example, to reach from one instance of the node 205 to another instance of the node 205, the user can travel through a plurality of a midpoint instance of the node 205. As illustrated in FIG. 6, to reach from "B" instance of the node 205 to "F" instance of the node 205, the user can travel through "C" instance of the node 205, "D" instance of the node 205, and "E" instance of the node 205.

The route classification 216 for the plurality of the candidate route 212 between "B" instance of the node 205 and "F" instance of the node 205 can be the functional class of level 4. The shortcut generator module 819 can generate the shortcut 602 based on the aggregating the plurality of the candidate route 212 with the same instances of the route classification 216. More specifically, the shortcut generator module 819 can generate the shortcut 602 based on linking one instance of the node 205 and another instance of the node 205 having the plurality of the candidate route 212 with the same instances of the route classification 216. As a result, the shortcut 602 can have the functional class of level 4 between "B" instance of the node 205 and "F" instance of the node 205.

For another example, the shortcut 602 can be generated based on the node classification 604 of FIG. 6. For a specific example, one instance of the node 205 can have the plurality of the node classification 604. More specifically, the node 205 with the node classification 604 of level 4 can also be level 3 based on a set rule of "FC=k node=FC=k−1 node". "FC" can represent functional class and "k node" can represent the node classification 604. As a result, "B" instance of the node 205 can also have the node classification 604 of level 3 in addition to level 4.

The shortcut generator module 819 can generate the shortcut 602 based on connecting one "FC=k node" to another adjacent "FC=k node." As discussed, "B" instance of the node 205 can have the node classification 604 of level 3. "C" instance of the node 205 can have the node classification 604 of level 1 or level 2, thus, "C" is not the another adjacent instance of the node 205 with the same instance of the node classification 604. However, "D" instance of the node 205 can have the node classification 604 of level 3 or level 2. As a result, "D" instance of the node 205 can represent the another adjacent instance of the node 205 to "B" instance of the node 205. The shortcut generator module 819 can generate the shortcut 602 with the route classification 216 of level 3 from "B" instance of the node 205 to "D" instance of the node 205.

It has been discovered that the navigation system 100 improves the performance for generating the travel route 214 of FIG. 2 by generating the shortcut 602. By generating the shortcut 602, the navigation system 100 can reduce the resource used for considering each instances of the candidate route 212. Moreover, the navigation system 100 can generate the travel route 214 based on the shortcut 602 rather than each instances of the candidate route 212. As a result, the burden placed on the navigation system 100 for generating the travel route 214 is reduced, thus, improving the performance for the safer operation of the navigation system 100 or the vehicle.

The navigation system 100 can include an estimation module 820, which can be coupled to the factor module 810. The estimation module 820 determines the misclassification 218 of the candidate route 212. For example, the estimation module 820 can determine the misclassification 218 of the route classification 216 for identifying the candidate route 212 misclassified within the neighboring area 204.

The estimation module 820 can determine the misclassification 218 in a number of ways. For example, the estimation module 820 can determine the misclassification 218 based on the area level 210 being greater than the route classification 216 attributed originally to the candidate route 212. For a specific example, the route classification 216 can be the functional class of level 4. The area level 210 of the candidate route 212 recomputed can be level 3. The estimation module 820 can determine that the misclassification 218 of the candidate route 212 exists if the importance level of the area level 210 exceeds the route classification 216. For example, the misclassification 218 can exist if "FC={e|(e∈$E_L$) and e's FC<L}," where "FC" can represent the route classification 216 and "L" can represent the area level 210.

For a different example, the estimation module 820 can determine the misclassification 218 based on the travel condition 226 meeting or exceeding the reclassification threshold 232 of FIG. 2. The reclassification threshold 232 can represent the speed limit. The travel condition 226 can represent the traffic speed. The traffic speed for the candidate route 212 can meet or exceed the speed limit. The candidate route 212 can have the route classification 216 of a high level, such as level 2, to indicate the importance of including the candidate route 212 with the traffic speed that meets or exceeds the speed limit as part of the travel route 214.

However, if the traffic speed for the candidate route 212 with the route classification 216 of level 2 is below the speed limit, the estimation module 820 can determine the misclassification 218 of the candidate route 212. More specifically, if the traffic speed is below the speed limit, the route classification 216 of the candidate route 212 should not be classified with a high level. As a result, the candidate route 212 with the route classification 216 of level 2 can be determined as misclassified.

For another example, the estimation module 820 can determine the misclassification 218 based on the travel cost 222 meeting or exceeding the reclassification threshold 232. The reclassification threshold 232 can represent the average travel time for traversing the candidate route 212. The travel cost 222 can represent an estimated travel time by the user of first device 102 for traversing the candidate route 212. The estimated travel time can be calculated based on traveling the distance 224 of the candidate route 212 with the current traffic speed.

The estimated travel time can dip below the average travel time. The candidate route 212 can have the route classification 216 of a low level, such as level 5, to indicate the unimportance of including the candidate route 212 with the estimated travel time that dips below the average travel time as part of the travel route 214. However, if the estimated travel time exceeds the average travel time, the estimation module 820 can determine the misclassification 218 of the candidate route 212 for being classified as low level.

For another example, the estimation module 820 can determine the misclassification 218 based on the user's preference 228. The candidate route 212 can represent the route type 230 of the local road. The route classification 216 for the local road can be level 5 even during the morning rush hour. The user's preference 228 can be traversing on the local road during the morning rush hour to avoid heavy traffic on the freeway. Based on the user's preference 228, the estimation module 820 can determine the misclassification 218 of the candidate route 212 with the route classification 216 of level 5 as misclassified when the user's preference 228 indicates the importance of traversing the local road during the morning rush hour.

It has been discovered that the navigation system 100 improves the accuracy for generating the travel route 214 that is optimal by determining the misclassification 218 of the candidate route 212. The travel route 214 having the candidate route 212 with the misclassification 218 results in the generation of the travel route 214 less optimal for the user of first device 102. By determining the misclassification 218, the navigation system 100 can generate accurate navigation information more efficiently for the safer operation of the navigation system 100 or the vehicle on the travel route 214 that is optimal.

The navigation system 100 can include a reclassification module 822, which can be coupled to the estimation module 820. The reclassification module 822 reclassifies the candidate route 212 for updating the route classification 216. For example, the reclassification module 822 can update the route classification 216 based on the misclassification 218 for reclassifying the candidate route 212.

The reclassification module 822 can reclassify the candidate route 212 in a number of ways. For example, the reclassification module 822 can reclassify the candidate route 212 based on the area level 210. As discussed previously, the route classification 216 attributed originally to the candidate route 212 can be level 4. However, the area level 210 of the candidate route 212 recomputed can be level 3. The misclassification 218 of the candidate route 212 can be determined as "FC" less than "L." The reclassification module 822 can update the route classification 216 based on the misclassification 218 by setting the route classification 216 equal to the area level 210.

It has been discovered that the present invention improves the accuracy for generating the travel route 214 that is optimal by updating the route classification 216 of the candidate route 212. By updating the route classification 216, the navigation system 100 can consider the candidate route 212 with the route classification 216 that is more accurately classified, thus, eliminating the overestimation or underestimation of the route classification 216. Based on the candidate route 212 updated, the navigation system 100 can generate accurate navigation information more efficiently for the safer operation of the navigation system 100 or the vehicle on the travel route 214 that is optimal.

For a different example, the reclassification module 822 can reclassify the candidate route 212 based on the distance 224 of the candidate route 212. More specifically, the reclassification module 822 can update the route classification 216 based on how much the preferred path 220 can increase or decrease a total distance of the travel route 214.

For a specific example, the candidate route 212 can have the route classification 216 of level 5 initially. The candidate route 212 of level 5 can be excluded from the initial consideration for generating the travel route 214. The reclassification threshold 232 can be the distance 224 of the travel route 214 generated based on the plurality of the candidate route 212 initially considered. After the recomputation of the candidate route 212, the candidate route 212 excluded can be determined as the preferred path 220 for having the shortest of the distance 224. By including the preferred path 220, the distance 224 of the travel route 214 can be reduced by 20% from the distance 224 of the travel route 214 without the preferred path 220. More specifically, the inclusion of the preferred path 220 can exceed the reclassification threshold 232 by 20%. The reclassification module 822 can update the route classification 216 to level 1 for exceeding the reclassification threshold 232 by 20%.

The update range 302 of FIG. 3 of the route classification 216 can base on a level of deviation above or below the reclassification threshold 232. For example, as discussed previously, the inclusion of the preferred path 220 can improve the distance 224 of the travel route 214 by 20%. The reclassification module 822 can raise the route classification 216 of the candidate route 212 by the update range 302 of four levels from level 5 to level 1. In contrast, if the improvement is limited to 1%, the reclassification module 822 can raise the route classification 216 of the candidate route 212 by the update range 302 of one level from level 5 to level 4.

It has been discovered that the present invention improves the accuracy of for generating the travel route 214 that is optimal by updating the route classification 216 incrementally based on a positive or negative deviation from the reclassification threshold 232. By updating the route classification 216 based on the update range 302 from the reclassification threshold 232, the navigation system 100 can consider the candidate route 212 with the route classification 216 that is more accurately classified, thus, eliminating the overestimation or underestimation of the route classification 216. Based on the candidate route 212 updated, the navigation system 100 can generate accurate navigation information more efficiently for the safer operation of the navigation system 100 or the vehicle on the travel route 214 that is optimal.

For another example, the reclassification module 822 can reclassify the candidate route 212 based on the travel condition 226. For example, the route classification 216 of the candidate route 212 can change based on the time period 234 of FIG. 2. More specifically, the candidate route 212 can represent the freeway. The route classification 216 for the freeway can be level 1.

However, the route classification 216 for the freeway can be downgraded to level 3 during the morning rush hour because of the slower traffic speed. The reclassification module 822 can upgrade or downgrade the route classification 216 based on the time period 234, such as the time of the day, to accommodate the travel condition 226 of the candidate route 212. For a specific example, the reclassification module 822 can upgrade the route classification 216 for the freeway on the hourly basis, such as the route classification 216 of level 3 at 8 AM, level 2 at 9 AM, and back to level 1 by LOAM.

For a different example, the reclassification module 822 can reclassify the candidate route 212 based on the travel cost 222. For example, the route classification 216 of the candidate route 212 can change based on the toll charged for the HOV lane. More specifically, the candidate route 212 can represent the HOV lane. The route classification 216 can be level 5 for the HOV lane when there is a financial charge of $5 U.S. dollar. However, the route classification 216 can be upgraded as the financial charge decreases. For a specific example, the route classification 216 can be level 1 when there is no financial charge for traversing the HOV lane.

It has been discovered that the present invention improves the accuracy of for generating the travel route 214 that is optimal by updating the route classification 216 dynamically based on the travel condition 226, the travel cost 222, or a combination thereof. By updating the route classification 216 dynamically based on the travel condition 226, the travel cost 222, or a combination thereof, the navigation system 100 can consider the candidate route 212 with the route classification 216 that is more accurately classified, thus, eliminating the overestimation or underestimation of the route classification 216. Based on the candidate route 212 updated, the navigation system 100 can generate accurate navigation information more efficiently for the safer operation of the navigation system 100 or the vehicle on the travel route 214 that is optimal.

For another example, the reclassification module 822 can reclassify the candidate route 212 based on the user's preference 228. For example, the candidate route 212 can be the local road. The route classification 216 for the local road can be level 5 originally. However, the user's preference 228 can indicate the desire to traverse on the local road rather than the freeway. The reclassification module 822 can reclassify the local road to be a higher level than level 5.

The navigation system 100 can include a route module 824, which can be coupled to the reclassification module 822. The route module 824 generates the travel route 214. For example, the route module 824 can generate the travel route 214 based on the candidate route 212 with the route classification 216 updated for displaying on the first device 102. For a specific example, the route module 824 can generate the travel route 214 based on including the preferred path 220.

For another example, the route module 824 can generate the travel route 214 using the functional class routing algorithm. Based on the candidate route 212 with the route classification 216 updated, the route module 824 can generate the travel route 214 with the candidate route 212 that was originally underestimated.

It has been discovered that the present invention improves the accuracy of for generating the travel route 214 that is optimal by considering the candidate route 212 with the route classification 216 that is more accurate. The consideration of the candidate route 212 with the route classification 216 that is updated minimizes the error, the poor attribution, or a combination thereof of the route classification 216 introduced by a third party, such as the government, the vendor, or a combination thereof. Further, the overestimation or the underestimation of the route classification 216 can be eliminated by accurately classifying the candidate route 212. Based on the candidate route 212 updated, the navigation system 100 can generate accurate navigation information more efficiently for the safer operation of the navigation system 100 or the vehicle on the travel route 214 that is optimal.

The physical transformation from the changes of the travel cost 222, the travel condition 226, or a combination thereof within the neighboring area 204 results in movement in the physical world, such as people using the first device 102, the vehicle, or a combination thereof, based on the operation of the navigation system 100. As the movement in the physical world occurs, the movement itself creates additional information that is converted back into the route classification 216, the misclassification 218 of the candidate route 212, the travel route 214, or a combination thereof for the continued operation of the navigation system 100 and to continue the movement in the physical world.

The first software 726 of FIG. 7 of the first device 102 of FIG. 7 can include the navigation system 100. For example, the first software 726 can include the area module 802, the candidate module 804, the factor module 810, the estimation module 820, the reclassification module 822, and the route module 824.

The first control unit 712 of FIG. 7 can execute the first software 726 for the area module 802 to calculate the neighboring area 204. The first control unit 712 can execute the first software 726 for the candidate module 804 to identify the candidate route 212. The first control unit 712 can execute the first software 726 for the factor module 810 to determine the distance 224, the travel condition 226, the travel cost 222, the user's preference 228, or a combination thereof.

The first control unit 712 can execute the first software 726 for the estimation module 820 to determine the misclassification 218. The first control unit 712 can execute the first software 726 for the reclassification module 822 to update the route classification 216. The first control unit 712 can execute the first software 726 for the route module 824 to generate the travel route 214.

The second software 742 of FIG. 7 of the second device 106 of FIG. 7 can include the navigation system 100. For example, the second software 742 can include the area module 802, the candidate module 804, the factor module 810, the estimation module 820, the reclassification module 822, and the route module 824.

The second control unit 734 of FIG. 7 can execute the second software 742 for the area module 802 to calculate the neighboring area 204. The second control unit 734 can execute the second software 742 for the candidate module 804 to identify the candidate route 212. The second control unit 734 can execute the second software 742 for the factor module 810 to determine the distance 224, the travel condition 226, the travel cost 222, the user's preference 228, or a combination thereof.

The second control unit 734 can execute the second software 742 for the estimation module 820 to determine the misclassification 218. The second control unit 734 can execute the second software 742 for the reclassification module 822 to update the route classification 216. The second control unit 734 can execute the second software 742 for the route module 824 to generate the travel route 214.

The navigation system 100 can be partitioned between the first software 726 and the second software 742. For example, the second software 742 can include the area module 802, the candidate module 804, the factor module 810, the estimation module 820, and the reclassification module 822. The second control unit 734 can execute modules partitioned on the second software 742 as previously described.

The first software 726 can include the route module 824. Based on the size of the first storage unit 714 of FIG. 7, the first software 726 can include additional modules of the navigation system 100. The first control unit 712 can execute the modules partitioned on the first software 726 as previously described.

The first control unit 712 can operate the first communication unit 716 of FIG. 7 to receive the route classification 216 updated from the second device 106. The first control unit 712 can operate the first software 726 to operate the location unit 720 of FIG. 7. The second communication unit 736 of FIG. 7 can send the route classification 216 updated to the first device 102 through the communication path 104 of FIG. 7.

The navigation system 100 describes the module functions or order as an example. The modules can be partitioned differently. For example, the area module 802 and the candidate module 804 can be combined. Each of the modules can operate individually and independently of the other modules.

Furthermore, data generated in one module can be used by another module without being directly coupled to each other. For example, the route classification 216 can receive the distance 224 from the factor module 810. The area module 802, the candidate module 804, the factor module 810, the estimation module 820, the reclassification module 822, and the route module 824 can be implement in as hardware accelerators (not shown) within the first control unit 712, or the second control unit 734, or can be implemented in as hardware accelerators (not shown) in the first device 102 or the second device 106 outside of the first control unit 712 or the second control unit 734.

Figure 9:
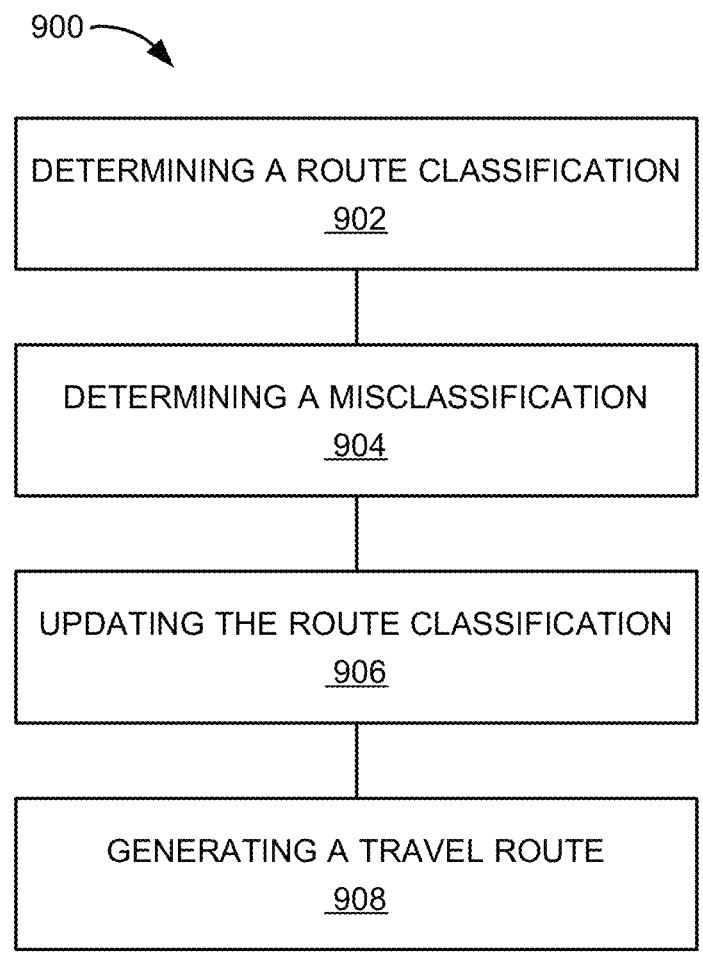
FIG. 9 is a flow chart of a method of operation of the navigation system of FIG. 1 in a further embodiment of the present invention.

Referring now to FIG. 9, therein is shown a flow chart of a method 900 of operation of the navigation system 100 of FIG. 1 in a further embodiment of the present invention. The method 900 includes: determining a route classification of a candidate route in a block 902; determining a misclassification of the route classification for identifying the candidate route misclassified in a block 904; updating the route classification based on the misclassification for reclassifying the candidate route in a block 906; generating a travel route based on the candidate route with the route classification updated for displaying on a device in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a route classification of a candidate route;
   determining a misclassification of the route classification based on an importance level of an area level of a neighboring area exceeding the importance level of the route classification for identifying the candidate route as misclassified;
   updating the route classification with a control unit based on the misclassification for reclassifying the candidate route; and
   generating a travel route based on the candidate route with the route classification updated for displaying on a device.

2. The method as claimed in claim 1 wherein determining the misclassification includes determining the misclassification of the candidate route within the neighboring area.

3. The method as claimed in claim 1 wherein updating the route classification includes reclassifying the candidate route based on the neighboring area where the candidate route is identified.

4. The method as claimed in claim 1 wherein updating the route classification includes updating the route classification for the candidate route unconsidered for generating the travel route.

5. The method as claimed in claim 1 wherein updating the route classification includes updating the route classification based on a user's preference for reclassifying the candidate route.

6. A method of operation of a navigation system comprising:
   determining a route classification of a candidate route;
   determining a misclassification of the route classification based on an importance level of an area level of a neighboring area exceeding the importance level of the route classification for identifying the candidate route misclassified;
   updating the route classification with a control unit based on the misclassification for reclassifying the candidate route; and
   generating a travel route to a target destination based on the candidate route with the route classification updated for displaying on a device.

7. The method as claimed in claim 6 wherein determining the misclassification includes determining the misclassification based on a travel cost meeting or exceeding a reclassification threshold.

8. The method as claimed in claim 6 wherein updating the route classification includes reclassifying the candidate route based on a travel condition for improving the route classification.

9. The method as claimed in claim 6 wherein generating the travel route includes generating the travel route based on a preferred path for considering the candidate route reclassified.

10. The method as claimed in claim 6 wherein updating the route classification includes upgrading the route classification for reclassifying the candidate route.

11. A navigation system comprising:
    a control unit for:
       determining a route classification of a candidate route,
       determining a misclassification of the route classification based on an importance level of an area level of a neighboring area exceeding the importance level of the route classification for identifying the candidate route misclassified,
       updating the route classification based on the misclassification for reclassifying the candidate route,
       generating a travel route based on the candidate route with the route classification updated, and
    a communication interface, coupled to the control unit, for transmitting the travel route for displaying on a device.

12. The system as claimed in claim 11 wherein the control unit is for determining the misclassification of the candidate route within the neighboring area.

13. The system as claimed in claim 11 wherein the control unit is for reclassifying the candidate route based on the neighboring area where the candidate route is identified.

14. The system as claimed in claim 11 wherein the control unit is for updating the route classification for the candidate route unconsidered for generating the travel route.

15. The system as claimed in claim 11 wherein the control unit is for updating the route classification based on a user's preference for reclassifying the candidate route.

16. The system as claimed in claim 11 wherein the control unit is for generating a travel route to a target destination based on the candidate route with the route classification updated for displaying on the device.

17. The system as claimed in claim 16 wherein the control unit is for determining the misclassification based on a travel cost meeting or exceeding a reclassification threshold.

18. The system as claimed in claim 16 wherein the control unit is for reclassifying the candidate route based on a travel condition for improving the route classification.

19. The system as claimed in claim 16 wherein the control unit is for generating the travel route based on a preferred path for considering the candidate route reclassified.

20. The system as claimed in claim 16 wherein the control unit is for upgrading the route classification for reclassifying the candidate route.

* * * * *